April 2, 1929.　　　E. G. GARTIN　　　1,707,631
DRILLING MECHANISM
Filed Oct. 17, 1921
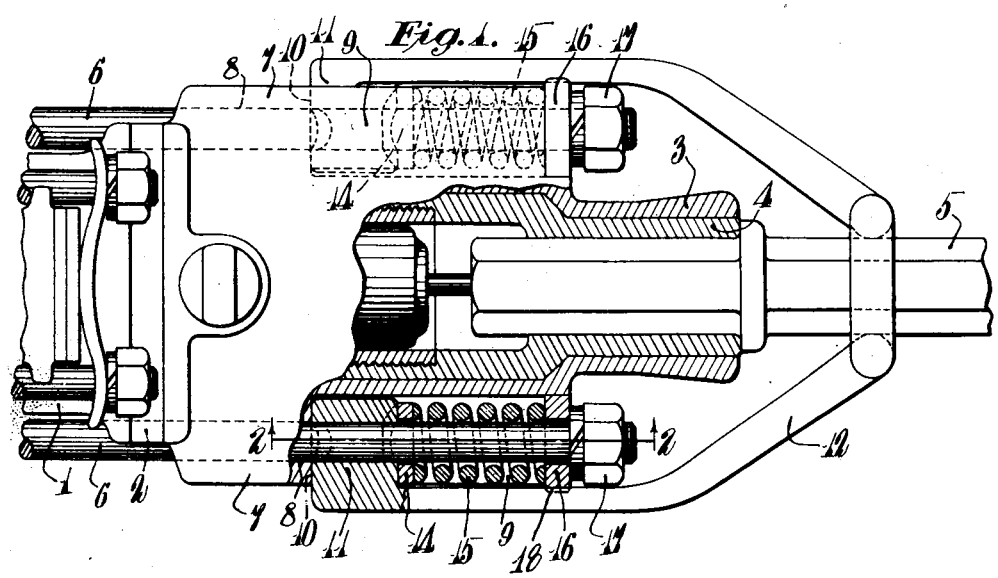
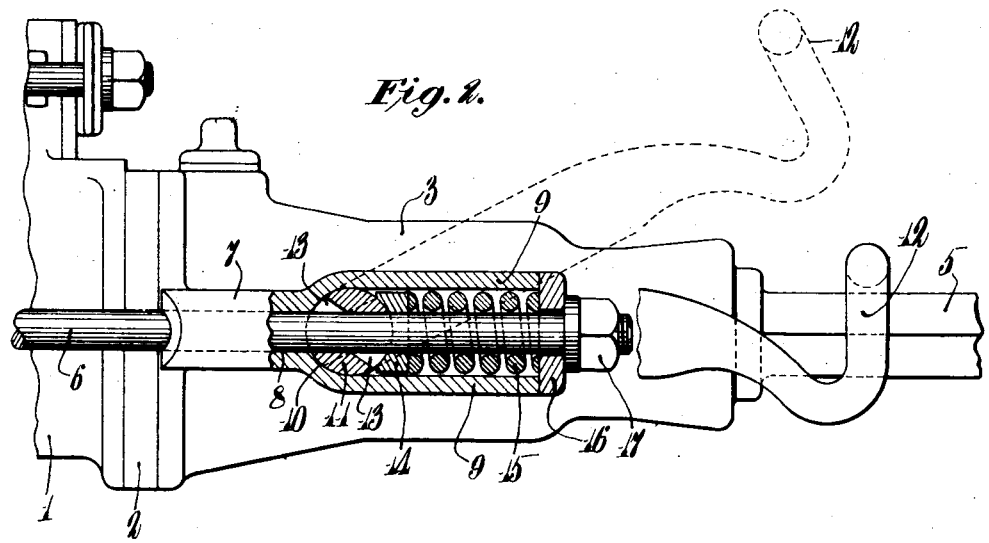
Inventor:
Elmer G. Gartin
by
Horace L. ...
atty.

Patented Apr. 2, 1929.

1,707,631

UNITED STATES PATENT OFFICE.

ELMER G. GARTIN, OF CLAREMONT, NEW HAMPSHIRE, ASSIGNOR TO SULLIVAN MACHINERY COMPANY, A CORPORATION OF MASSACHUSETTS.

DRILLING MECHANISM.

Application filed October 17, 1921. Serial No. 508,334.

My invention relates to drilling mechanisms, and more particularly to tool retaining means for use in connection therewith.

An object of my invention is to provide an improved drilling mechanism. Another object of my invention is to provide an improved mechanism for maintaining the parts of a drilling mechanism in tight operative relation and for providing simultaneously a resilient connection for a tool retaining member therewith. Other objects and advantages of my invention will hereinafter more fully appear.

In the accompanying drawings I have shown for purposes of illustration one form which my invention may assume in practice.

In these drawings,—

Fig. 1 is a view partially in elevation and partially in central longitudinal section through the front end of a drilling mechanism provided with the illustrative form of my invention.

Fig. 2 is a view of the mechanism shown in Fig. 1 taken at right angles thereto partially in elevation and partially in section, on the line 2—2 of Fig. 1.

In the illustrative form of my invention I have shown it applied to a rock drill having a cylinder 1, a front head 2 and a chuck housing 3, the chuck housing having rotatable therein a chuck member 4 adapted to receive a drill steel 5. The chuck housing, front head member and cylinder are held in proper relationship by side rods 6 which pass through the rear head of the cylinder (not shown) and extend forwardly through sleeve members 7 formed integrally with the chuck housing member 3. These sleeve members, as best shown in Fig. 2, are bored as indicated at 8 to be a snug fit for the side rod 6 while at their front ends they are enlarged and formed into a pair of spaced parallel webs 9. Guided between the webs 9 and slidably mounted on the side rods are generally cylindrical journal members 11 of a resilient tool retainer 12. The members 11 are bored or broached or otherwise formed to provide inter-connected angularly disposed passages 13 which permit the retainer to be swung into steel holding position or to be moved angularly into inoperative position as indicated in dotted lines in Fig. 2, the members 11 being journaled in the semi-cylindrical seats 10 at the rear end of the webs 9. A follower 14 shaped upon its surface adjacent the members 11 to fit the same is slipped over the side rods 6 and, a heavy spring 15 having been placed around the rods between the followers 14 and the ends thereof, a cap or closure member 16 is placed over the rods and by means of nuts 17 the spring 15 is compressed into the space between the webs 9 and the head member 16 brought up into tight engagement with the front end of the sleeve member 7. It will be noted that the sides of the members 16 are notched or cut away as at 18 into which the side elements of the tool retainer 12 may snap to hold the same in tool retaining position. As a result it will be evident that the front and back heads of the cylinder and the chuck housing are all held absolutely rigid with respect to the cylinder, while the drill steel retainer is resiliently mounted on the side rods and is permitted by the spring 15 to have some freedom of movement, the friction of the member 14 upon the journal members 11 serving to hold the steel retainer in the dotted line position shown.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent, is:

1. In a drilling mechanism, a cylinder member, a chuck housing in alinement therewith, rods held in fixed position as to forward movement relative to the cylinder, a tool retainer, springs cooperating therewith to hold it in various positions, and adjustable means cooperating with said rods and operative on adjustment thereof to rigidly connect the cylinder member and chuck housing and simultaneously place said springs under compression.

2. In a drilling mechanism, a cylinder member, chuck housing in alinement therewith, rods held against forward movement relative to said chuck housing, a drill retainer pivotally mounted on said rods, springs cooperating with said retainer to maintain it in selected positions and mounted on said side rods, and means cooperating with said rods for rigidly connecting the cylinder member and the chuck housing and simultaneously compressing the springs.

3. In a drilling mechanism, a cylinder member, a front head member therefor, a chuck housing, side rods extending longitudinally of the cylinder, lugs bored to receive said side rods secured on said chuck housing, a tool retainer pivotally mounted on said side rods, springs on said side rods in advance of the pivots of said tool retainer, and common means for holding said cylinder, head member and chuck housing in rigid relation and simultaneously placing said springs under compression.

4. In a drilling mechanism, a cylinder member, a front head member therefor, a chuck housing, side rods extending longitudinally of the cylinder, lugs bored to receive said side rods secured on said chuck housing and having enlarged pockets in the forward ends thereof, a tool retainer pivoted on said side rods and extending through said pockets, springs in said pockets on said side rods in advance of the pivots of said tool retainer, and common means for holding said cylinder, head member and chuck housing in rigid relation and simultaneously placing said springs under compression.

5. A drilling mechanism comprising a plurality of members, means for holding the same together including a plurality of tensioned side rods, resilient means and tool retaining means disposed within the longitudinal tensioned portion of said rods that hold the members together, means for tensioning said rods and compressing said resilient means, and means for limiting the initial compression of said resilient means independently of further tensioning of said rods.

6. A drilling mechanism, tool retaining means therefor, tension rods for connecting said means to said mechanism, resilient means, said resilient and retaining means disposed within the longitudinal tensioned portion of said rods that connects said retaining means and mechanism, means for tensioning said rods and compressing said resilient means, and means for limiting the initial compression of said resilient means independently of further tensioning of said rods.

7. A drilling mechanism, tool retaining means therefor, side rods for holding the same together, resilient means for said retaining means, means for simultaneously tensioning said rods and compressing said resilient means, and means for limiting the initial compression of said resilient means independently of further tensioning of said rods.

8. A drilling mechanism comprising a plurality of members, means for holding said members together including a plurality of tensioned side rods, resilient means and tool retaining means, means for tensioning said rods and compressing said resilient means, and means for limiting the initial compression of said resilient means independently of further tensioning of said rods.

9. A drilling mechanism comprising a plurality of parts, means for holding said parts together, tool retaining means, resilient means for said retaining means, means for tensioning said holding means and compressing said resilient means, and means for limiting the initial compression of said resilient means independently of further tensioning of said holding means.

10. A drilling mechanism comprising a plurality of parts, means including side rods for rigidly holding said parts in operative position, a pivoted tool retainer adjacent one of said parts, resilient positioning means for said retainer, common means for tensioning said rods and compressing said resilient means, and means for limiting the compression of said resilient means.

11. A drilling mechanism comprising a plurality of parts, means including side rods for holding said parts together, a pivoted tool retainer adjacent one of said parts, resilient positioning means for said retainer, and common means for exerting a limited compression on said resilient means and an unlimited tension on said rods.

12. In a drilling mechanism comprising a cylinder and a chuck housing and having arcuate bearing surfaces formed thereon, a pivoted yieldable tool retainer having cylindrical journal members engageable with said arcuate surfaces, resilient positioning means for said retainer, means including side rods for rigidly holding said cylinder and housing together, and common means for tensioning both said rods and compressing said resilient means.

13. In a drilling mechanism comprising a plurality of parts, means for rigidly holding said parts together, a pivoted tool retainer, a resilient mounting for said retainer, and common means for tensioning both said holding means and compressing said resilient means.

In testimony whereof I affix my signature.

ELMER G. GARTIN.